Patented Oct. 20, 1936

2,058,081

UNITED STATES PATENT OFFICE 2,058,081

COMPOUND OF α-METHYL-HEPTYL-HYDRO-CUPREICINE AND PROCESS OF MAKING SAME

Fritz Johannessohn, Mannheim-Feudenheim, and Heinrich Thron, Mannheim-Waldhof, Germany, assignors to Rare Chemicals, Inc., Nepara Park, N. Y., a corporation of New York No Drawing. Application December 24, 1935, Serial No. 56,078. In Germany December 28, 1934

3 Claims. (Cl. 260—26)

It has been found that the bactericidal power of the camphoric salt of α-methyl-heptyl-hydro-cupreicine, the toxin of octyl-hydro-cupreine or, as it will be called for short in the following, the octyl-hydro-cupreicine, considerably exceeds that of other salts of the same basic substance. While the other salts, such as the hydrochloric, boric or rhodanic octyl-hydro-cupreicine, kill bacteria as pneumococcus and staphylococcus in a solution of 1:16000 up to 1:20000, the camphoric octyl-hydro-cupreicine does so even in a solution of 1:40000.

The object of the present invention is, therefore, the preparation of the hitherto unknown camphoric octyl-hydro-cupreicine in a manner used for the production of salts generally. As an example, octyl-hydro-cupreicine of the formula

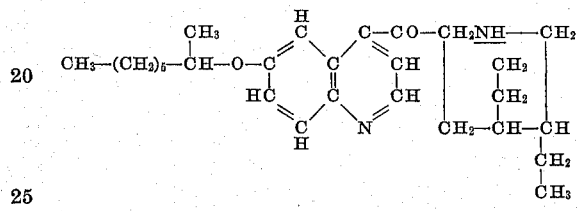

can be combined direct with camphoric acid but one can also allow to interact salts of both compounds with each other, as for example the sulphuric or hydrochloric octyl-hydro-cupreicine with the barium or with the ammonium or silver salt of the camphoric acid respectively. In these reactions the camphoric acid is added to the imido group (underlined in the formula).

Examples (1) 424 parts of octyl-hydro-cupreicine, 100 parts of camphoric acid and 3000 parts of water are heated to 50–60° C. until dissolved. The solution which is of neutral reaction, is then treated with active carbon, filtered and the filtrate evaporated to dryness. The camphoric octyl-hydro-cupreicine of the formula $(C_{27}H_{40}O_2N_2)_2.C_8H_{14}.(COOH)_2$ is obtained in the form of a brownish resin and can be ground to a light-brown powder. It is easily soluble in lukewarm water but difficult to dissolve in boiling water. It is soluble in alcohol, ether, acetone, chloroform and benzene; in benzine it is practically insoluble. It contains 80.9% of octyl-hydro-cupreicine and 19.1% of camphoric acid. If the compound is heated with some conc. sulphuric acid, a smell of caprylic alcohol becomes perceptible.

(2) To 46 parts of a 10% solution of hydrochloric octyl-hydro-cupreicine in equal parts of water is added a solution of camphoric ammonia, corresponding in its composition to 10 parts of camphoric acid in 35 parts of water. A mucous solution results from which on heating on the water bath the camphoric octyl-hydro-cupreicine is separated out in the form of a yellowish resin while the ammonium chloride formed in the reaction remains in the solution. The resin is purified by dissolving in 5 parts of lukewarm water and further heating the solution on the water bath. The camphoric octyl-hydro-cupreicine is freed from the liquid, dried and powdered. It is free from chlorine.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claims to any modification not covered by these claims is expressly reserved.

We claim:

1. A new composition of matter, the camphoric salt of α-methyl-heptyl-hydro-cupreicine of the formula $(C_{27}H_{40}O_2N_2)_2.C_8H_{14}.(COOH)_2$ a slightly coloured powder, easily soluble in lukewarm water, difficultly soluble in boiling water, soluble in alcohol, ether, acetone, chloroform, benzene, hardly soluble in benzine.

2. The process for preparing the camphoric salt of the α-methyl-heptyl-hydro-cupreicine comprising the addition of camphoric acid to the imido-group of the α-methyl-heptyl-hydro-cupreicine.

3. The process for preparing the camphoric salt of the α-methyl-heptyl-hydro-cupreicine comprising the addition of camphoric acid to the imido-group of the α-methyl-heptyl-hydro-cupreicine by interaction of a salt of the α-methyl-heptyl-hydro-cupreicine with a salt of the camphoric acid.

FRITZ JOHANNESSOHN.
HEINRICH THRON.